United States Patent [19]
Kang

[11] Patent Number: 5,622,060
[45] Date of Patent: Apr. 22, 1997

[54] LIBR AQUEOUS SOLUTION INJECTION APPARATUS OF A FREEZER SYSTEM

[75] Inventor: In-seok Kang, Inchon, Rep. of Korea

[73] Assignee: LG Electronics Inc., Rep. of Korea

[21] Appl. No.: 438,949

[22] Filed: May 12, 1995

[30] Foreign Application Priority Data

May 13, 1994 [KR] Rep. of Korea ........... 10513/1994

[51] Int. Cl.⁶ .......................... F25B 15/00; B01D 47/16
[52] U.S. Cl. ................. 62/485; 62/494; 261/88; 165/DIG. 72
[58] Field of Search ............... 62/476, 484, 485, 62/494; 261/88, 115; 165/DIG. 72, DIG. 171, DIG. 326

[56] References Cited

U.S. PATENT DOCUMENTS

| | | | |
|---|---|---|---|
| 1,024,326 | 4/1912 | Gowder | 261/88 |
| 2,319,565 | 5/1943 | Stratton | 261/88 |
| 3,158,008 | 11/1964 | Aronson | 62/483 |
| 3,533,607 | 10/1970 | Powers | 261/88 |
| 5,255,534 | 10/1993 | Ryan | 62/476 |

FOREIGN PATENT DOCUMENTS 162678  5/1921  United Kingdom ............ 261/88

*Primary Examiner*—William Doerrler
*Attorney, Agent, or Firm*—Ostrolenk, Faber, Gerb & Soffen, LLP

[57] ABSTRACT

A LiBr aqueous solution apparatus of the horizontal suction type freezer, comprising a main injection pipe for guiding a LiBr aqueous solution contained therein and the main injection pipe being connected to a regenerator, a sub-injection pipe coupled to one end of a lower portion of the main injection pipe, an injection blade rotatably connected to a circumferential portion of the sub-injection pipe, a plurality of injection holes alternatively formed at one side of an opposite surface, and, through holes formed with a center portion of the injection blade.

4 Claims, 4 Drawing Sheets

LIBR AQUEOUS SOLUTION INJECTION APPARATUS OF A FREEZER SYSTEM

BACKGROUND OF THE INVENTION

1. Field of the Invention

The present invention relates to a LiBr aqueous solution injection apparatus of a freezer system, and more particularly, it relates to improvements therein for securing the LiBr aqueous solution injection apparatus upon a sub-injection pipe.

2. Description of the Conventional Art

A LiBr aqueous solution injection apparatus of a horizontal suction type freezer is a very useful apparatus.

As shown in FIG. 1, reference numeral 1 denotes an absorber located between a regenerator 6 and a condenser 7. In the absorber 1, horizontal heat transfer tubes 2 are provided with a predetermined space from an intermediate portion of the absorber 1, respectively. A LiBr aqueous injection apparatus 3 is provided at an upper part of the horizontal heat transfer tube 2. Also, an evaporator 4 having a heater 4a is downwardly spaced from the horizontal heat transfer tube 2.

A collection tank 5 is connected to the lower part of the absorber 1 in order to collect the LiBr aqueous solution discharged from the LiBr aqueous injection apparatus 3.

In order to regenerate the LiBr solution discharged from the collection tank 5, a regenerator 6 is connected to the collection tank 5 via pump 8 and valve 8a. The regenerator 6 includes a cooling coil 9 for controlling an inner temperature of the regenerator 6 and a heating means 9a.

The regenerator 6 is connected to a condenser 7 through a valve 8a. The condenser 7 is also connected to the evaporator 4 via pump 8 and valve 8a. A cooling coil 9 is provided within an upper part of the condenser 7.

In order to accomplish heat exchange with cooling water which flows in the horizontal heat transfer tube 2 by heat of vaporization, it is necessary to provide an aqueous solution membrane on a surface of the horizontal heat transfer tube 2 by discharging the LiBr aqueous solution on the horizontal heat transfer tube 2.

As shown in FIG. 2A, a main injection pipe 11 is integrally connected to a nozzle 12. The main injection pipe 11 and nozzle 12 are spaced at a certain distance from the horizontal heat transfer tubes 2. The LiBr aqueous solution discharged via pump 8 and valves 8a from the regenerator 6 is distributed in a regular amount via an injection hole 12a of the nozzle 12 as shown in FIG. 2C.

When a pressure of the LiBr aqueous solution contained in the nozzle 12 reaches about 3 Kg/cm2, it is injected at angles of 60 to 80 degrees via the injection hole 12a of the nozzle 12 as shown in FIGS. 2B and 2C.

Since the injected LiBr aqueous solution contact the upper surface of the horizontal heat transfer tube 2, it can be absorbed with a refrigerating vapor due to the LiBr aqueous solution membrane 2b formed on the surface of the horizontal heat transfer 2. At this time, it is accomplished with the heat exchange from the cooling water of the horizontal heat transfer tube 2.

FIG. 3 shows a tray injection type LiBr aqueous solution injection apparatus.

As shown in FIGS. 3A and 3B, in the LiBr aqueous solution injection apparatus, the LiBr aqueous solution discharged from absorber 1 by operating a pump 8 from regenerator 6 (refer to FIG. 1) which is filled with a main injection pipe 11a. Since a plurality of projections 11c are formed with the main injection pipe 11a, the LiBr aqueous solution flows downwards via slit grooves or slots 11b as shown in FIGS. 3B and 3C. That is, the LiBr aqueous solution is discharged from the horizontal heat transfer tubes 2 via the slit grooves 11b.

After the LiBr aqueous solution is discharged from the slit grooves 11b, the actuating relation of the LiBr aqueous solution in the tray injection type LiBr aqueous solution injection apparatus, is similar to that of the nozzle injection type LiBr aqueous solution injection apparatus.

The above-mentioned LiBr aqueous solution injection apparatus poses the following problems.

Although the conventional nozzle injection type LiBr aqueous solution injection apparatus discharges the aqueous solution equally among all to the upper surfaces of the horizontal heat transfer tubes, pressure loss is greatly increased due to the small size of the injection holes. Thus, it is economically disadvantages due to the required continuous increase of pumping power of the pumps.

On the other hand, since the LiBr aqueous solution is run down through the slit grooves in the tray injection type LiBr aqueous solution injection apparatus, the LiBr aqueous solution having a high surface tension, is not equally divided into the horizontal heat transfer tubes. Also, the LiBr aqueous solution is not formed with a complete and uniformly thin membrane on the horizontal heat transfer tubes because the LiBr aqueous solution tends to form a thick-stem type membrane.

Consequently, a heat transfer efficiency of the tray injection type LiBr aqueous solution injection apparatus is lower than the LiBr aqueous solution injection apparatus having a nozzle and also the total efficiency, of the freezer decreases.

SUMMARY OF THE INVENTION

It is an object of this invention to provide an improved LiBr aqueous solution injection apparatus.

It is another object of this invention to provide a LiBr aqueous solution injection apparatus in which a freezer absorbing and a heat transfer efficiencies are increased.

According to the present invention, an improved LiBr aqueous solution injection apparatus is provided using an injection blade. This invention comprises a main injection pipe for guiding the LiBr aqueous solution contained therein and the main injection pipe being connected to a regenerator, a sub-injection pipe fixed to one end of a lower portion of the main injection pipe, an injection blade rotatably connected to a circumferential portion of the sub-injection pipe and said injection blade being rotated by a rotational torque of the injection blade upon discharging the LiBr aqueous solution via the injection hole from the injection blade, a plurality of injection holes alternatively formed at one side of an opposite surface, and, through holes formed on a center portion of the injection blade.

DESCRIPTION OF THE PREFERRED EMBODIMENTS

A LiBr aqueous solution apparatus according to the present invention will be described with the reference to FIGS. 4 and 5.

Figure 1:
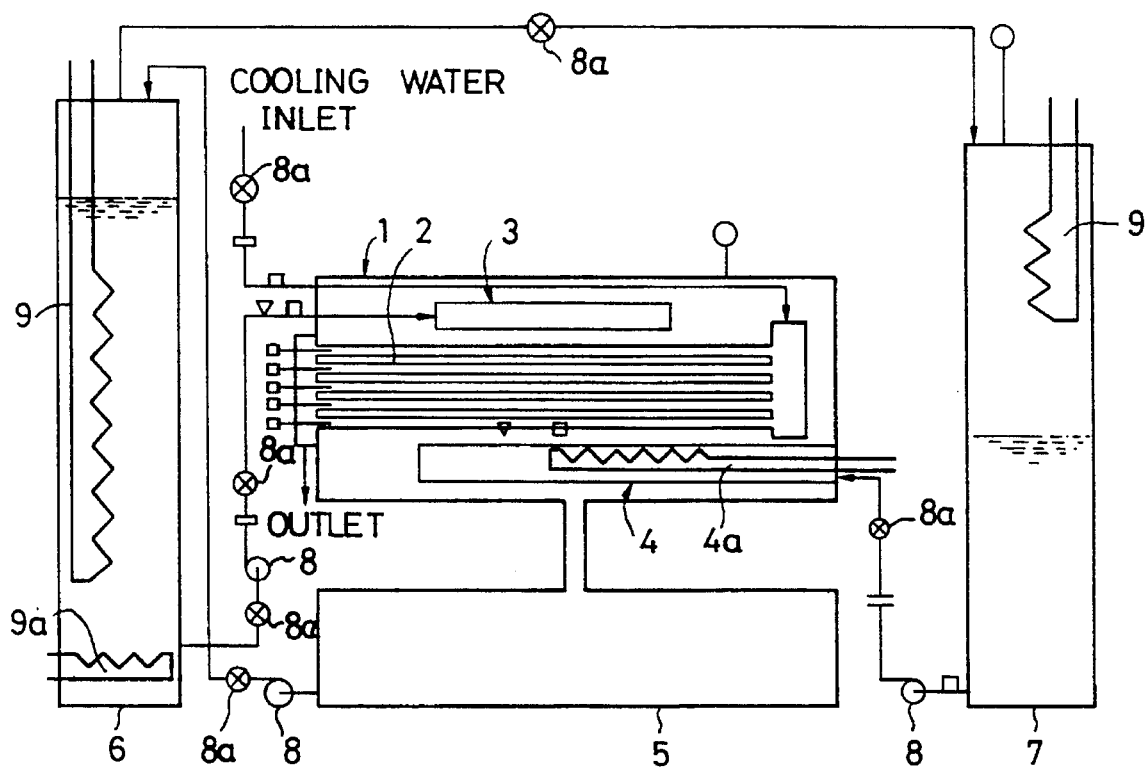
FIG. 1 is a schematic view of a conventional horizontal suction type freezer.
Figure 2A:
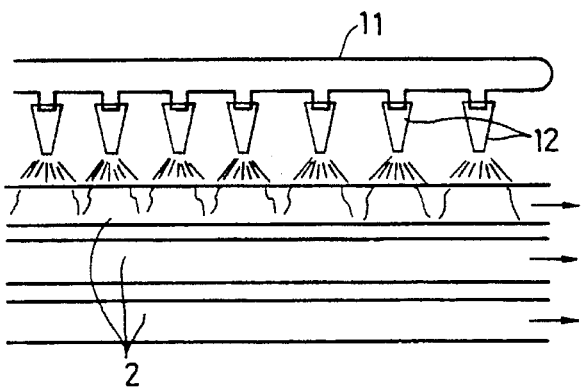
FIG. 2A is an enlarged front view of a nozzle injection type LiBr aqueous solution injection apparatus known in a conventional art.
Figure 2B:
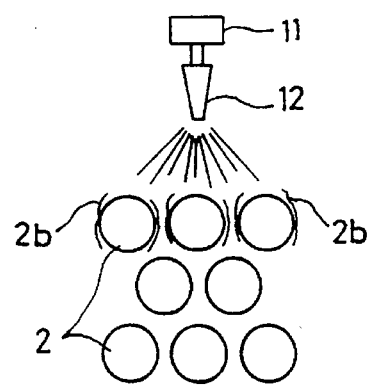
FIG. 2B is a side view of the LiBr aqueous solution injection apparatus shown in FIG. 2A.
Figure 2C:
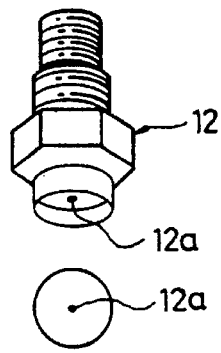
FIG. 2C is an enlarged perspective view of a nozzle.
Figure 3A:
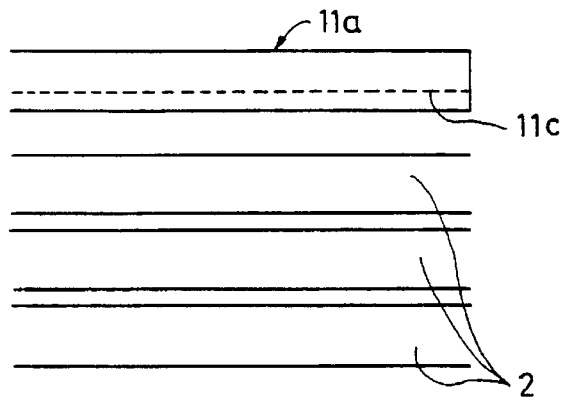
FIG. 3A is an enlarged front view of a tray injection type LiBr aqueous solution injection apparatus known in the conventional art.
Figure 3B:
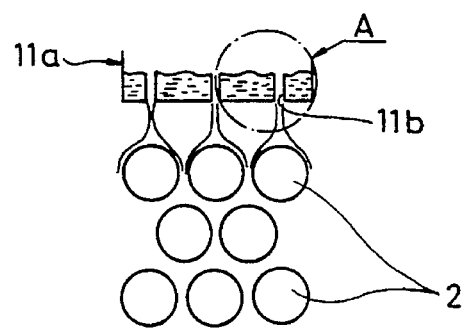
FIG. 3B is a side view of the LiBr aqueous solution apparatus shown in FIG. 3A.
Figure 3C:
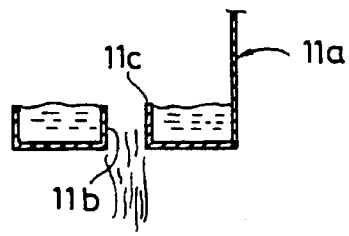
FIG. 3C is an enlarged view of the principle part A shown in FIG. 3B.
Figure 4:
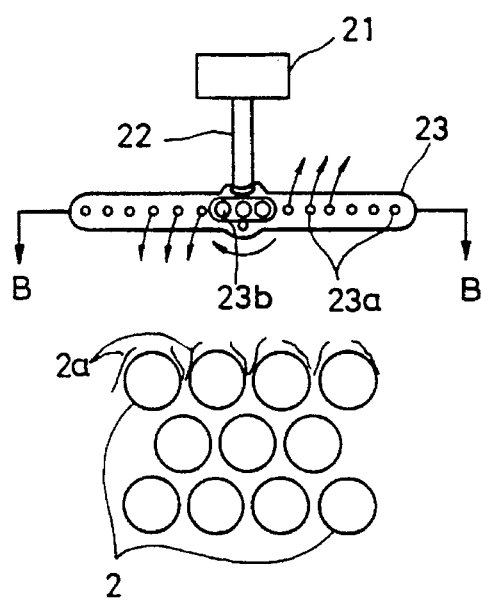
FIG. 4 is a front view of a LiBr aqueous solution injection apparatus according to the present invention.

As shown in FIG. 4, the LiBr aqueous solution apparatus includes a main injection pipe 21 in order to guide a LiBr aqueous solution, having a predetermined position, contained in the main injection pipe 21 connected to a regenerator 6 (refer to FIG. 1 ), a sub-injection pipe 22 coupled to one end of a lower portion of the main injection pipe 21, an injection blade 23 rotatably connected to a circumferential portion of the sub-injection pipe 22.

A plurality of injection holes 23a are formed at predetermined sides of the injection blade 23 with a regular gap in order to inject the LiBr aqueous solution. Also, a plurality of through holes 23b are provided on an intermediate portion of the injection blade 23. The diameter of through hole 23b is larger than that of the injection hole 23a.

Figure 5:
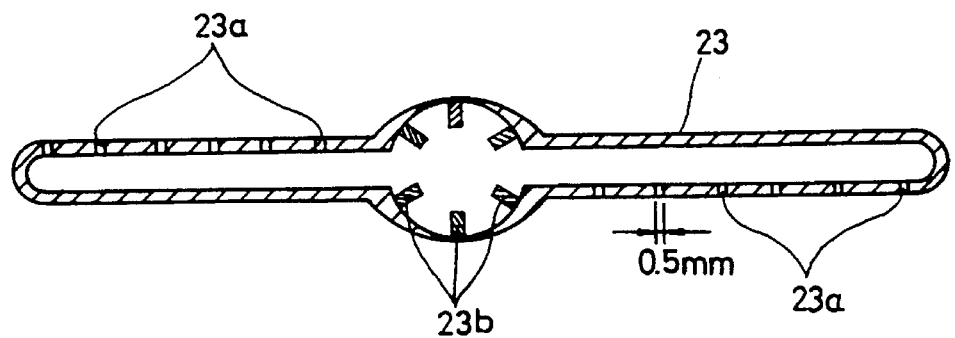
FIG. 5 is a cross sectional view taken along the line B—B shown in FIG. 4.

As shown in FIG. 5, the injection holes 23a are formed in such a way that they face each other crosswise. That is, the injection holes 23a are formed on one side of the injection blade 23 and also on the other side of the injection blade 23, respectively.

Therefore, the injection blade 23 is rotated by a rotational torque of the injection blade 23 upon discharging the LiBr aqueous solution via the injection hole 23a from the injection blade 23.

The configuration of the injection hole 23a can be a circular shape, an elliptic shape or a tumbler shape (not shown in the drawings). The diameter of the injection hole 23a is 0.5 mm. Different modifications of the dimensioning and the configuration of the injection hole 23a are conceivable.

The operations of the LiBr aqueous solution apparatus will be described hereinafter with reference to the respective drawings.

The LiBr aqueous solution contained in the absorber 1 by the pump 8 from the regenerator 6, flows to the sub-injection pipe 22 via the main injection pipe 21. Since the sub-injection pipe 22 is connected to the injection blade 23, the LiBr aqueous solution proceeds to an inner side of the injection blade 23 as shown in FIG. 5. That is, the LiBr aqueous solution is injected to the outside of the injection blade 23 through the injection hole 23a via through hole 23b.

When the LiBr aqueous solution is discharged to the outside of injection blade 23, the injection blade 23 is rotated with a regular speed by a rotation torque occurring from the LiBr aqueous solution via the injection hole 23a. As a result, the LiBr aqueous solution is uniformly injected to the upper surface of the horizontal heat transfer tube 2.

In the LiBr aqueous solution apparatus, the rotation torque is calculated corresponding to the formula $$F=MV$$

Where the value F is a general force caused by the mechanical relation between the LiBr aqueous solution and the injection holes 23a formed with the injection blade 23. The force F is actuated with an opposite direction to an injection direction of the LiBr aqueous solution. The value M is a flow rate per a unit time of the LiBr aqueous solution discharged from the injection hole 23a of the injection blade 23. Also, the value V is an instant speed of the LiBr aqueous solution upon discharging the LiBr aqueous solution form the injection hole 23a.

The rotation torque is satisfied with the following conditions.

$$T=r1F1+r2F2+r3F3+\ldots$$

The F1,F2,F3 are forces which occur in the injection hole 23a of the injection blade 23 and the r1,r2,r3 are distances from a center portion of the sub-injection pipe 22 to a center portion of the injection hole 23a.

Since the injection holes 23a are formed on both sides of the injection blade 23 by partly through, respectively, the rotation torque of the injection blade 23 is formed twice.

Also, the LiBr aqueous solution is broadly and uniformly injected to the upper surfaces of the horizontal heat transfer tubes 2.

Thus, according to the present invention, the LiBr aqueous solution apparatus has not only a broad injection region but also a LiBr aqueous solution membrane having a thin thickness.

Therefore, the present LiBr aqueous solution apparatus is simple in construction and it is possible to ensure the reduction of the pressure loss and pumping force of other driving source. Furthermore, since the injection region is broadly provided, the LiBr aqueous solution membranes are also formed on the upper surfaces of the horizontal heat transfer tubes, thereby obtaining good efficiency of the freezer.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A LiBr aqueous solution injection apparatus for heat exchange between a LiBr aqueous solution and cooling water which flows in horizontal heat transfer tubes in an absorber, comprising:

a main injection pipe for guiding a LiBr aqueous solution;

a sub-injection pipe coupled to one end of a lower portion of the main injection pipe;

a horizontal injection blade provided above the horizontal heat transfer tubes and rotatably connected to a circumferential portion of the sub-injection pipe;

a plurality of injection holes formed at opposing portions on each end of said injection blade;

through holes formed at a center portion of the injection blade; and said injection blade being rotatable by a rotational torque produced by the LiBr aqueous solution discharging through the injection holes, so that the LiBr aqueous solution is uniformly injected onto upper surfaces of the horizontal heat transfer tubes to form a uniform thin layer thereon.

2. The LiBr aqueous solution injection apparatus of claim 1, wherein said injection holes of the injection blade have a round shape.

3. The LiBr aqueous solution injection apparatus of claim 1, wherein said through holes are larger than said injection holes.

4. The LiBr aqueous solution injection apparatus of claim 1, wherein said injection holes of the injection blade are elliptic in shape.

* * * * *